US009137440B2

(12) United States Patent
Choi

(10) Patent No.: US 9,137,440 B2
(45) Date of Patent: Sep. 15, 2015

(54) APPARATUS FOR PROVIDING REAL-TIME IMAGE DATA

(71) Applicant: LSIS CO., LTD., Anyang-si, Gyeonggi-do (KR)

(72) Inventor: Sung Hyun Choi, Suwon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/858,759

(22) Filed: Apr. 8, 2013

(65) Prior Publication Data

US 2013/0335597 A1    Dec. 19, 2013

(30) Foreign Application Priority Data

Jun. 14, 2012   (KR) .................. 10-2012-0063740

(51) Int. Cl.
*H04N 5/232*   (2006.01)
*H04N 7/18*    (2006.01)

(52) U.S. Cl.
CPC ........... *H04N 5/23229* (2013.01); *H04N 5/232* (2013.01); *H04N 7/188* (2013.01)

(58) Field of Classification Search
None
See application file for complete search history.

(56) References Cited

U.S. PATENT DOCUMENTS

| 2002/0161796 | A1* | 10/2002 | Sylthe ........................... 707/500 |
| 2004/0085462 | A1  | 5/2004  | Sasaki |
| 2005/0275834 | A1* | 12/2005 | Silver ......................... 356/237.1 |
| 2005/0276445 | A1* | 12/2005 | Silver et al. .................... 382/103 |
| 2008/0165268 | A1  | 7/2008  | Takahashi et al. |
| 2010/0080484 | A1* | 4/2010  | Shimodaira ................... 382/264 |

FOREIGN PATENT DOCUMENTS

| JP | 11-331766    | 11/1999 |
| JP | 2000-050238  | 2/2000  |
| JP | 2000-242327  | 9/2000  |
| JP | 2000-250621  | 9/2000  |
| JP | 2001-125612  | 5/2001  |
| JP | 2004153849   | 5/2004  |
| JP | 2004-236020  | 8/2004  |
| JP | 2010-130097  | 6/2010  |
| JP | 2011-155421  | 8/2011  |
| JP | 2011-223502  | 11/2011 |

OTHER PUBLICATIONS

Japan Patent Office Application Serial No. 2013-090103, Office Action dated Jan. 23, 2014, 9 pages.
Japan Patent Office Application Serial No. 2013-090103, Notice of Allowance dated Dec. 9, 2014, 4 pages.
European Patent Office Application Serial No. 13165933.6 Search Report dated Apr. 30, 2015, 7 pages.

* cited by examiner

*Primary Examiner* — Albert Cutler
(74) *Attorney, Agent, or Firm* — Lee, Hong, Degerman, Kang & Waimey

(57) ABSTRACT

Disclosed are an apparatus and a method for providing an image to provide real-time image data photographed by an image photographing apparatus. The apparatus includes a real-time image data receiving unit to receive the real-time image data; a real-time image data filtering unit to image-process the real-time image data; a real-time image data storing unit to store the real-time image data of a specific section from among the image-processed real-time image data; and a display unit to display the real-time image data.

4 Claims, 4 Drawing Sheets

APPARATUS FOR PROVIDING REAL-TIME IMAGE DATA

CROSS REFERENCE TO RELATED APPLICATION

Pursuant to 35 U.S.C. §119(a) this application claims the benefit of earlier filing date and right of priority to Korean Patent Application No. 10-2012-0063740, filed on Jun. 14, 2012, the contents of which are incorporated by reference herein in its entirety.

BACKGROUND

The embodiment relates to an apparatus and a method for proving an image having an improved quality in real time in an HMI (Human Machine Interface) system. Automatic equipment used in industrial fields consists of mechanical equipment including a relay. There is a difficulty to change the automatic equipment consisting of the mechanical equipment because internal circuits of the automatic equipment must be changed. In order to overcome such a difficulty, the PLC is used.

In general, the Programmable Logic Controller (PLC) has a function of a computer. After the PLC receives a signal output from equipment and processes the signal according to contents programmed in the PLC, the PLC outputs the processed signal to the equipment. That is, the normal operation of the PLC signifies that the automatic equipment in a factory works efficiently. Thus, there is a need to continuously monitor the operation of PLC.

An HMI (Human Machine Interface) system connected to the PLC is generally utilized to monitor the PLC. Further, the HMI system may be utilized to monitor an industrial field by using a media apparatus. The HMI system provides the monitoring result as visual information.

However, since the HMI system provides the monitoring result of the current time only, in the case that the PLC operation or the monitoring result of the industrial field before the current time are needed, for example, when an unexpected accident has occurred in the industrial field so that monitoring results before the unexpected accident are needed, the HMI system represents limitations to utilize the monitoring results and provides a bad quality of an image according to environment of the industrial field.

SUMMARY

The embodiment provides an apparatus and a method for proving an image capable of outputting image data of a desired time point through an HMI system.

The embodiment provides an apparatus and a method for proving an image capable of outputting image data having improved quality through an HMI system.

According to the embodiment, there is provided an apparatus for providing an image to provide real-time image data photographed by an image photographing apparatus. The apparatus includes a real-time image data receiving unit to receive the real-time image data; a real-time image data filtering unit to image-process the real-time image data; a real-time image data storing unit to store the real-time image data of a specific section from among the image-processed real-time image data; and a display unit to display the real-time image data.

According to the embodiment, there is provided a method of providing an image to provide real-time image data photographed by an image photographing apparatus. The method includes receiving the real-time image data; enhancing contrast of the real-time image data; interpolating the contrast enhanced real-time image data; storing the real-time image data of a specific section from among the interpolated real-time image data; and displaying the stored real-time image data.

According to the embodiment, image data of a desired time point can be output through the HMI system.

Further, according to the embodiment, image data having an improved quality can be output through the HMI system.

DETAILED DESCRIPTION OF THE EMBODIMENTS

Figure 1:
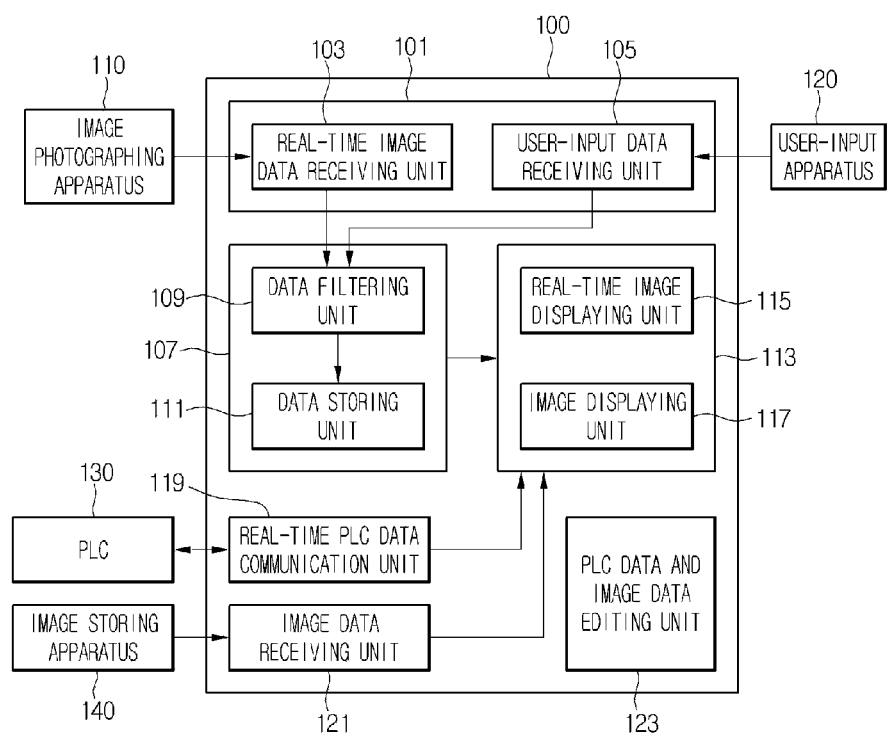
FIG. 1 is a block diagram showing an apparatus for providing an image according to the embodiment.

Hereinafter, embodiments will be described in detail with reference to accompanying drawings so that those skilled in the art can easily work with the embodiments. However, the embodiments may not be limited to those described below, but have various modifications. The elements, which are not concerned with the description of the embodiments in the drawings, may be omitted for the purpose of convenience or clarity. The same reference numbers will be assigned the same elements throughout the drawings.

In the following description, when a part is connected to the other part, the parts are not only directly connected to each other, but also electrically connected to each other while interposing another part therebetween.

In the following description, when a predetermined part "includes" a predetermined component, the predetermined part does not exclude other components, but may further include other components unless indicated otherwise.

FIG. 1 is a block diagram showing an apparatus for providing an image according to the embodiment.

Referring to FIG. 1, the apparatus 100 for proving an image according to the embodiment includes a data receiving unit 101, a data processing unit 107, a display unit 113, a real-time PLC data communication unit 119, an image data receiving unit 121, and a PLC data and image data editing unit 123. An HMI system may provide a user with an image photographed through an image photographing apparatus 110 and an image transmitted from an image storing unit 140 by using the apparatus for providing an image 100. Further, the HMI system may monitor the operation of a load connected to a PLC in communication with the PLC.

The data receiving unit 101 includes a real-time image data receiving unit 103 and a user-input data receiving unit 105.

The real-time image data receiving unit 103 obtains the real-time image data of an image photographed in real time by the image photographing apparatus 110.

The user-input data receiving unit 105 obtains user-input data input through a user-input apparatus 120. The user-input data include image process request information. For example, the image process request information may include image brightness adjustment request information, image enlargement or reduction request information, specific-time image display request information and recording request information, but the embodiment is not limited thereto. The apparatus 100 for proving an image may process an image, which will be displayed on a display unit 113, through the data processing unit 107 according to the obtained user-input data.

The data processing unit 107 includes a data filtering unit 109 and a data storing unit 111.

The data filtering unit 109 may include a Gaussian filter, an image inverting unit, a gamma filter and a bilinear interpolation filter (not shown). The data filtering unit 109 may process an image according to the image brightness adjustment request information included in user input data by using the Gaussian filter, the image inverting unit and the gamma filter. If the brightness of a monitoring place is too bright or dim, it is difficult to identify a monitored object therein. The reason is that the lightness contrast of an image is low so that it is difficult to relatively identify an object. In this case, if the data filtering unit 109 including the image processing filter which enhances the contrast during a low-contrast section processes real-time image data, the entire contrast of a real-time image so that an monitored object may be identified in a place of which a brightness contrast is low.

Further, the data filtering unit 109 may process an image according to image size adjustment request information included in the user-input data by using the bilinear interpolation filter. For example, the image size adjustment request information may include information of requesting to enlarge a specific portion of an obtained image or information of requesting to reduce the entire image in order to monitor a larger place. The bilinear interpolation filter is a filter which generates a new pixel value by applying a linear weight according to a distance between adjacent pixels. For example, if the data filtering unit 109 including the bilinear interpolation filter processes the real-time image data, the new pixel value is generated for an empty pixel when enlarging the specific portion of the image, so that more smooth and clear image may be provided. Further, the data filtering unit 109 may receive the image data received by the image data receiving unit 221 and then, may process the image data according to the image brightness adjustment request information or the image size adjustment request information included in the user-input data.

The data storing unit 111 includes a first buffer, a second buffer, and a memory (not shown). After, the data storing unit 111 stores temporarily and sequentially frames of the real-time image data in the first buffer, the data storing unit 111 may selectively store the frame satisfying the image display request information of the specific time point included in the user-input data in the second buffer. Further, the data storing unit 111 may selectively store the frame, which is a target of the recording request information included in the user-input data, in the memory. The real-time image data frames stored in the memory include previously photographed image data frames based on a current time point. Thus, when the apparatus 100 for providing an image according to the embodiment is used, even if an unexpected accident occurs in a place, the image data stored in the data storing unit 111 may be provided, so that the image before the accident may be obtained.

The real-time PLC data communication unit 119 receives real-time PCL data from the PLC 130. For example, the real-time PLC data may include data about the operation of a load connected to the PLC 130.

The image data receiving unit 121 receives image data except for the real-time image data which the real-time image data receiving unit 103 receives. The image data receiving unit 121 may obtain the image data stored in the image storing apparatus 140.

The PLC data and image data editing unit 123 edits the real-time PLC data which the real-time PLC data communication unit 119 receives and the image data which the image data receiving unit 121 receives according to the user-input information.

The display unit 113 may include a real-time image displaying unit 115 and an image displaying unit 117. The real-time image displaying unit 115 displays the real-time image data which is processed by the data processing unit 107 on a screen. The image displaying unit 117 displays the real-time PLC data which the real-time PLC data communication unit 119 receives and the image data which the image data receiving unit 121 receives on the screen. In this case, the image displaying unit 117 may display the PLC data and the data edited by the image data editing unit 123 on the screen.

Figure 2:
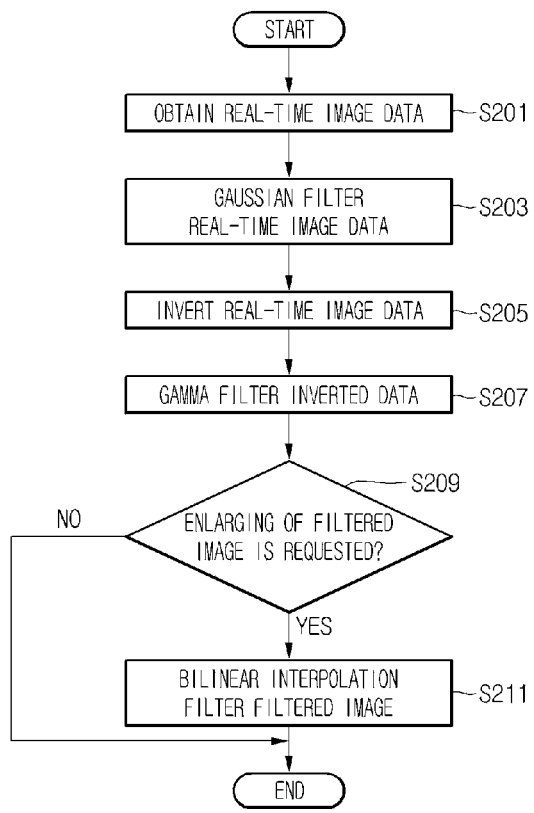
FIG. 2 is a flowchart illustrating a method for processing an image according to the embodiment.

FIG. 2 is a flowchart illustrating a method for processing an image according to the embodiment.

Referring to FIG. 2, the data filtering unit 109 filters the image obtained by the real-time image data receiving unit 103 according to the user input data obtained from the user-input apparatus 120. According to the embodiment, the data filtering unit 109 may perform processes of Gaussian filtering, inverting and gamma filtering the real-time image data in order to improve a quality of real-time image data. Further, regardless of control of an image size, the data filtering unit 109 may perform a process of bilinear interpolation filtering the real-time image data in order to maintain a predetermined image quality.

In step S201, the real-time image data receiving unit 103 obtains a real-time image photographed by the image photographing apparatus 110.

Then, in the step S203, the data filtering unit 109 Gaussian filters the obtained real-time image data. The data filtering unit 109 may blur the real-time image data through the Gaussian filtering process. For example, the data filtering unit 109 Gaussian filters the real-time image data with the mask size of 9×9. Further, the data filtering unit 109 may Gaussian filter the image data received at the image data receiving unit 221. Hereinafter, since the procedure of processing the image data is the same as that of the real-time image data, the detailed description will be omitted.

Then, in step S205, the data filtering unit 109 inverts the real-time image data which is Gaussian filtered.

Then, in step S207, the data filtering unit 109 gamma-filters the inverted real-time image data. At this time, for example, the data filtering unit 109 may perform the gamma filtering by using the real-time data obtained through the step S201 and the real-time data inverted through step S205. A pixel value $I_{out}(x,y)$ of the real-time image, which is gamma-filtered by using a pixel value $I_{in}(x,y)$ of the obtained real-time image and a pixel value 'mask' of the inverted real-time image, is expressed as following Equation 1:

$$I_{out}(x, y) = 255 \times \left(\frac{I_{in}(x, y)}{255}\right)^{\left(2^{\left(\frac{128-mask}{128}\right)}\right)}$$ [Equation 1]

Figure 4:
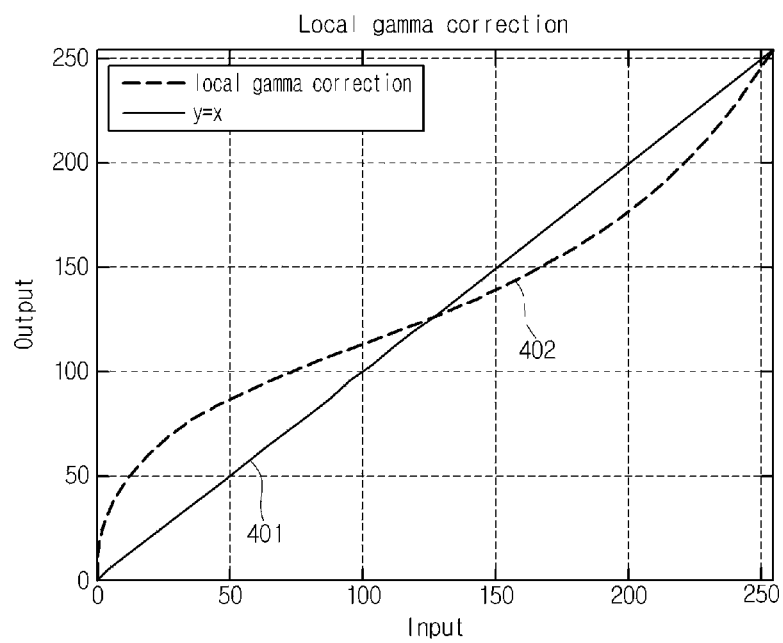
FIG. 4 is a view illustrating a gamma filtering process of an image according to the embodiment.

Refer to FIG. 4 about the total derivatives of the gamma filter. In the gamma-filtered real-time image, a bright portion is processed more darkly and a dark portion is processed more brightly when compared with the real-time image before the gamma filtering process. Thus, when the gamma-filtering process for the real-time image data is performed, a color of a monitored object may be distinguished from colors of surrounding environment even if the working environment is bright or dark as a whole.

The user-input data receiving unit 105 acquires user-input data from the user-input apparatus 120.

In step S209, the data filtering unit 109 determines whether there is a request of enlarging the gamma-filtered real-time image based on the acquired user-input data.

In step 211, if there is the request of enlarging the real-time image, the data filtering unit 109 performs bilinear interpolation filtering for the filtered real-time image data. The bilinear interpolation algorithm may be expressed as following Equation 2:

$$I_{out}(x, y) = \frac{I_{in}(Q_{11})}{(x_2 - x_1)(y_2 - y_1)}(x_2 - x)(y_2 - y) +$$

$$\frac{I'_{in}(Q_{21})}{(x_2 - x_1)(y_2 - y_1)}(x - x_2)(y_2 - y) +$$

$$\frac{I'_{in}(Q_{12})}{(x_2 - x_1)(y_2 - y_1)}(x_2 - x)(y - y_1) +$$

$$\frac{I'_{in}(Q_{22})}{(x_2 - x_1)(y_2 - y_1)}(x - x_1)(y - y_1)$$

[Equation 2]

which are previously known, $I_{in}'(Q_{11})$, $I_{in}'(Q_{12})$, $I_{in}'(Q_{21})$ and $I_{in}'(Q_{22})$ denote pixel values of the previously known pixel coordinates, and $I_{out}(x,y)$ denotes a pixel value of a pixel coordinate to be enlarged. When enlarging an image, the pixel value of the coordinate to be enlarged is calculated through Equation 2. A coordinate system for the bilinear interpolation refers to FIG. 5. Thus, if the process of bilinear interpolation filtering a real-time image data is performed, an image distortion phenomenon, which may occur in a size adjusting process, is reduced.

When the user-input data does not include the request of enlarging the real-time image, the data filtering unit 109 terminates the filtering processes.

Figure 3:
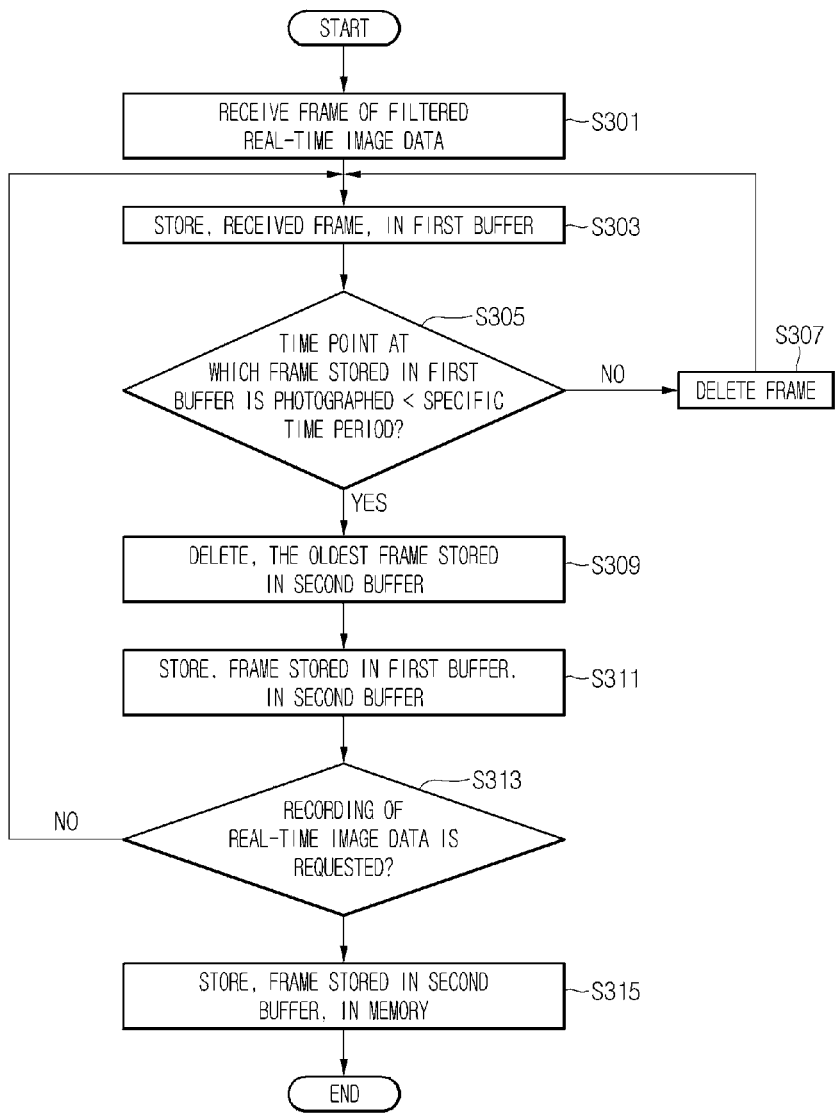
FIG. 3 is a flowchart illustrating a method of storing an image according to the embodiment.

FIG. 3 is a flowchart illustrating a method of storing an image according to the embodiment.

Referring to FIG. 3, the data storing unit 111 stores the image of the images filtered by the data filtering unit 109, which is photographed at a specific time point. According to the embodiment, the data storing unit 111 may sequentially store previous images that are photographed before the current time point, may selectively store the previous images of the sequentially stored previous images, that are photographed for one minutes before the current time point, and may selectively store the previous image of the selectively stored previous image, that correspond to the image recording request according to the user-input data.

In step S301, the data storing unit 111 obtains the real-time image data filtered in the data filtering unit 109. The data storing unit 111 may receive the filtered real-time image data by units of frames.

Then, in step S303, the data storing unit 111 stores the obtained frame in the first buffer. The first buffer is a space for temporarily storing an image frame of the received real-time image data frames before deleting the image frame, which is photographed before the current time point.

Then, in step S305, the data storing unit 111 determines whether the time point at which the frame stored in the first buffer is photographed is within a specific time period). The specific time period may include not only a specific time point in past set by a user according to a purpose of the HMI system, but also a specific time period in past. For example, the data storing unit 111 determines whether the frame stored in the first buffer is photographed before one minute from the current time.

At this time, in step S307, when the time point at which the frame stored in the first buffer is not within the specific time period, the data storing unit 111 deletes the corresponding frame. In step S303, after deleting the frame, the data storing unit 111 stores a new received frame in the first buffer.

To the contrary, when the time point at which the frame stored in the first buffer is within the specific time period, the data storing unit 111 stores the corresponding frame in the second buffer. In step S309, when a frame storing space of the second buffer is insufficient, for example, the data storing unit may delete the oldest frame from the second buffer. However, the data storing unit 111 may secure the frame storing space in the second buffer through any other schemes. Then, in step S311, the data storing unit 111 stores the corresponding frame in the second buffer.

In step S313, the data storing unit 111 determines whether the user-input data includes the information about the request of recording an real-time image data or not.

In step S315, when the user-input data includes the information about the request of recording an real-time image data, the data storing unit 111 stores the frame stored in the second buffer in the memory.

To the contrary, in step S303, when the user-input data does not include the information about the request of recording an real-time image data, the data storing unit 111 stores the new received frame in the first buffer.

FIG. 4 is a view illustrating a gamma filtering process of an image according to the embodiment.

Referring to FIG. 4, in a graph of the total derivatives of the gamma filter depicted according the gamma filtering process performed in step S207, the x-axis denotes input data and the y-axis denotes output data. In the graph, if a straight line 401 denotes original image data before the gamma filtering process, a curved line 402 denotes image data which is gamma filtered. As a result of the gamma filtering, a dark portion of the image data may be displayed more brightly and a bright portion of the image data may be displayed more darkly.

Figure 5:
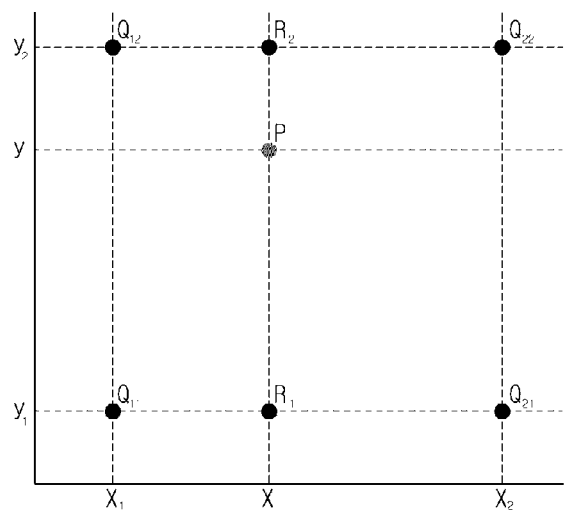
FIG. 5 is a view illustrating an interpolation filtering process of an image according to the embodiment.

FIG. 5 is a view illustrating an interpolation filtering process of an image according to the embodiment.

Referring to FIG. 5, a bilinear interpolation coordinate system is depicted, in which $Q_{11}$, $Q_{12}$, $Q_{21}$ and $Q_{22}$ denote previous known coordinates and P denotes a new generated coordinate. A pixel generated through the bilinear interpolation scheme is a sum of values obtained by multiplying the most adjacent pixels by a weight which is determined through a linear scheme and inversely proportional to distances between the pixels.

The embodiment described above can be implemented not only through an apparatus and a method, but also through a program which executes the functions corresponding to the elements of the embodiment or recording media on which the program is recorded. Such an implementation may be readily embodied by those skilled in the art based on the above disclosure.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. A method of providing an image to provide real-time image data photographed by an image photographing apparatus, the method comprising:
receiving the real-time image data;
enhancing contrast of the real-time image data;
interpolating the contrast enhanced real-time image data;
storing the real-time image data of a specific section from among the interpolated real-time image data; and
displaying the stored real-time image data,
wherein the storing of the real-time image data of the specific section includes:
sequentially storing, the interpolated real-time image data, in a first buffer for a predetermined time period;
storing selected real-time image data of the real-time image data stored in the first buffer, in a second buffer according to information about a request of displaying an image at a specific time point of the real-time image data, and
storing the real-time image data stored in the second buffer, in a memory, according to an information about a request of recording the real-time image data,
determining whether the time point at which a frame stored in the first buffer is photographed is within a specific time period,
when the time point at which the frame stored in the first buffer is not within the specific time period, deleting the corresponding frame,
when the time point at which the frame stored in the first buffer is within the specific time period, storing a corresponding frame in the second buffer, and
selectively storing in the second buffer a frame satisfying an information about the request of displaying the image at the specific time point of the real-time image data,
receiving user-input data including at least one of information about an image process of the real-time image data or information about the specific section of the real-time image data,
wherein the information about the image process of the real-time image data includes at least one of information about a request of controlling image brightness of the real-time image data or information about a request of controlling an image size of the real-time image data,
wherein the enhancing of the contrast includes:
Gaussian filtering the real-time image data according to the information about the request of controlling the image brightness of the real-time image data;
inverting the Gaussian filtered real-time image data; and
gamma-filtering the inverted real-time image data.

2. The method of claim 1, wherein the storing of the real-time image data of the specific section includes storing real-time imaged data for a previous section from a current time point.

3. The method of claim 1, wherein the interpolating of the contrast enhanced real-time image data is performed through a bilinear interpolation algorithm according to the information about the request of controlling the image size of the real-time image data and generates a new pixel value by applying a linear weight to the real-time image data according to a distance between adjacent pixels.

4. The method of claim 1, wherein the information about the specific section of the real-time image data includes at least one of information about a request of displaying an image at a specific time point of the real-time image data or information about a request of recording the real-time image data.

* * * * *